US012568331B2

(12) United States Patent
Ishizuka et al.

(10) Patent No.: US 12,568,331 B2
(45) Date of Patent: Mar. 3, 2026

(54) METHOD, SYSTEM, AND STORAGE MEDIUM FOR CONTROLLING LOUDSPEAKER GROUP DELAY

(71) Applicant: Yamaha Corporation, Shizuoka (JP)

(72) Inventors: Kenji Ishizuka, Shizuoka (JP); Takahiro Ohno, Shizuoka (JP)

(73) Assignee: Yamaha Corporation, Hamamatsu (JP)

( * ) Notice: Subject to any disclaimer, the term of this patent is extended or adjusted under 35 U.S.C. 154(b) by 267 days.

(21) Appl. No.: 18/469,514

(22) Filed: Sep. 18, 2023

(65) Prior Publication Data

US 2024/0007791 A1 Jan. 4, 2024

Related U.S. Application Data

(63) Continuation of application No. PCT/JP2021/012622, filed on Mar. 25, 2021.

(51) Int. Cl.

*H04R 3/04* (2006.01)
*H04R 1/26* (2006.01)
*H04S 7/00* (2006.01)

(52) U.S. Cl.

CPC ................. *H04R 3/04* (2013.01); *H04R 1/26* (2013.01); *H04S 7/307* (2013.01); *H04S 2400/01* (2013.01)

(58) Field of Classification Search

CPC .. H04R 3/04; H04R 1/26; H04S 7/307; H04S 2400/01

See application file for complete search history.

(56) References Cited

U.S. PATENT DOCUMENTS

2015/0350786 A1* 12/2015 Capp ...................... H03G 5/165 381/103
2021/0152936 A1 5/2021 Takahashi et al.

FOREIGN PATENT DOCUMENTS

| | | | |
|---|---|---|---|
| JP | H02272819 | A | 11/1990 |
| JP | 2001211493 | A | 8/2001 |
| JP | 2008134421 | A | 6/2008 |
| WO | 2019203127 | A1 | 10/2019 |

OTHER PUBLICATIONS

JP 2001/211493A English machine translation (Year: 2001).*
JP 2008/134421A English machine translation (Year: 2008).*
International Search Report in PCT/JP2021/012622, dated May 18, 2021.

* cited by examiner

*Primary Examiner* — James K Mooney
(74) *Attorney, Agent, or Firm* — Spencer Fane LLP

(57) ABSTRACT

A method includes acquiring a latency value defining delay of sound through a filter, acquiring a first group delay indicating delay for each frequency of sound of a first loudspeaker, acquiring a second group delay indicating delay for each frequency of sound of a second loudspeaker, calculating an adjustment amount for adjusting a first audio signal supplied to the first loudspeaker and/or a second audio signal supplied to the second loudspeaker, such that a difference in the sounds of the first and second loudspeakers in a target band is reduced, and generating, in accordance with the adjustment amount, a frequency response of a first filter that controls characteristics of the first audio signal and/or a frequency response of a second filter that controls characteristics of the second audio signal, while controlling a latency of the first filter and/or the second filter in accordance with the latency value.

15 Claims, 6 Drawing Sheets

METHOD, SYSTEM, AND STORAGE MEDIUM FOR CONTROLLING LOUDSPEAKER GROUP DELAY

CROSS-REFERENCE TO RELATED APPLICATIONS

This application is a continuation application of International Application No. PCT/JP2021/012622, filed on Mar. 25, 2022. The entire disclosures of International Application No. PCT/JP2021/012622 are hereby incorporated herein by reference.

BACKGROUND

Technological Field

This disclosure relates to a method, system, and storage medium for controlling loudspeaker group delay.

Background Information

Methods for controlling the characteristics of a loudspeaker using a filter are known. Japanese Laid-Open Patent Publication No. H2-272819 discloses a technology for flattening the group delay of the sound of a loudspeaker by setting the frequency response of the filter of a loudspeaker.

SUMMARY

However, the technology of Japanese Laid-Open Patent Publication No. H2-272819 can only be used to flatten the group delay of the sound of one loudspeaker. If sound is output from both a first loudspeaker and a second loudspeaker, the technology of Japanese Laid-Open Patent Publication No. H2-272819 cannot be used to match the group delay of the sound of the first loudspeaker and the group delay of the sound of the second loudspeaker.

The object of this disclosure is to match the group delay of the sound of the first loudspeaker and the group delay of the sound of the second loudspeaker.

In order to solve the problem described above, a method for controlling loudspeaker group delay according to this disclosure comprises acquiring a latency value that defines delay of sound through a filter, acquiring a first group delay indicating delay for each frequency of sound of a first loudspeaker, acquiring a second group delay indicating delay for each frequency of sound of a second loudspeaker, calculating an adjustment amount for adjusting at least one of a first audio signal supplied to the first loudspeaker, or a second audio signal supplied to the second loudspeaker, or both, such that a difference in the sound of the first loudspeaker and the sound of the second loudspeaker in a target band, which is a band to be adjusted, is reduced, and generating, in accordance with the adjustment amount, at least one or both frequency responses of at least one or both filters, which are at least one of a frequency response of a first filter that controls characteristics of the first audio signal supplied to the first loudspeaker, or a frequency response of a second filter that controls characteristics of the second audio signal supplied to the second loudspeaker, or both, while controlling a latency of the at least one or both filters in accordance with the latency value.

The system according to this disclosure comprises one or more processors and one or more memory units. The one or more processors are configured to execute a program stored in the one or more memory units, thereby acquiring a latency value that defines delay of sound through a filter, acquiring a first group delay representing delay for each frequency of sound of a first loudspeaker, acquiring a second group delay representing delay for each frequency of sound of a second loudspeaker, calculating an adjustment amount for adjusting at least one of a first audio signal supplied to the first loudspeaker, or a second audio signal supplied to the second loudspeaker, or both, such that a difference between the sound of the first loudspeaker and the sound of the second loudspeaker in a target band, which is the band to be adjusted, is reduced, and generating, in accordance with the adjustment amount, at least one or both frequency responses of at least one or both filters, which are at least one of a frequency response of a first filter that controls characteristics of the first audio signal supplied to the first loudspeaker, or a frequency response of a second filter that controls characteristics of the second audio signal supplied to the second loudspeaker, or both, while controlling a latency of the at least one or both filters in accordance with the latency value.

One or more non-transitory storage media for a storage of a computer-readable program according to this disclosure causes one or more processors to perform a process comprises acquiring a latency value that defines delay of sound through a filter, acquiring a first group delay representing delay for each frequency of sound of a first loudspeaker, acquiring a second group delay representing delay for each frequency of sound of a second loudspeaker, calculating an adjustment amount for adjusting at least one of a first audio signal supplied to the first loudspeaker, or a second audio signal supplied to the second loudspeaker, or both, such that a difference between the sound of the first loudspeaker and the sound of the second loudspeaker in a target band, which is a band to be adjusted, is reduced, and generating, in accordance with the adjustment amount, at least one or both frequency responses of at least one or both filters, which are at least one of a frequency response of a first filter that controls characteristics of the first audio signal supplied to the first loudspeaker, or a frequency response of a second filter that controls characteristics of the second audio signal supplied to the second loudspeaker, or both, while controlling a latency of the at least one or both filters in accordance with the latency value

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

1. Hardware Configuration of the Setting Device

Figure 1:
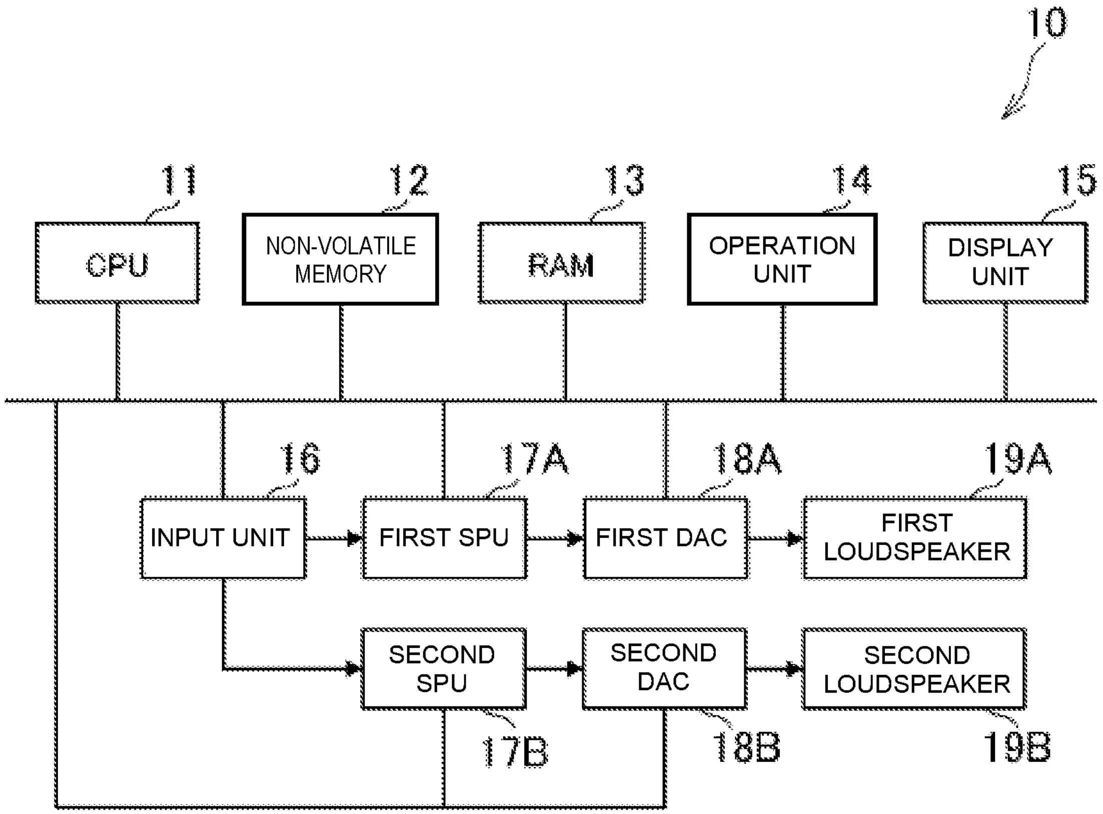
FIG. 1 is a diagram showing an example of the hardware configuration of the setting device.

An embodiment example of a method for controlling group delay of loudspeakers (speakers) will be described. In this embodiment, a case in which this method is performed by a setting device will be described. FIG. 1 is a diagram showing an example of the hardware configuration of the setting device. For example, the setting device 10 is a digital mixer, signal processor, audio amplifier, electronic musical instrument, personal computer, tablet terminal, smartphone, or digital assistant.

A CPU 11 includes one or more processors. The CPU 11 is one example of at least one processor as an electronic controller of the setting device 10. Here, the term "electronic controller" as used herein refers to hardware, and does not include a human. The setting device 10 can include, instead of the CPU 11 or in addition to the CPU 11, one or more types of processors, such as a GPU (Graphics Processing Unit), a DSP (Digital Signal Processor), an FPGA (Field Programmable Gate Array), an ASIC (Application Specific Integrated Circuit), and the like.

A non-volatile memory 12 is a memory (computer memory) such as ROM (read-only memory) or/and hard disk. RAM (random-access memory) 13 is an example of volatile memory. The non-volatile memory 12 is an example of one or more memory units (one or more computer memories) storing a program. The one or more memory units can be any computer storage device or any non-transitory computer-readable medium with the sole exception of a transitory, propagating signal.

An operation unit 14 is an input device (user operable input) such as a touch panel or a mouse. A display unit (display) 15 is a liquid-crystal display or an organic EL display, or another type of display. An input unit 16 acquires audio signals from the outside or the non-volatile memory 12. The audio signals are signals that represent sound. The audio signals can be digital or analog signals.

In this embodiment, "to acquire" means to receive. For example, information specified by a user is received from the outside, so that the setting device 10 acquires this information. "To obtain" means to obtain as a result of processing. For example, the frequency response is obtained as a result of a process such as an inverse Fourier transform, so that the setting device 10 "obtains" the frequency response.

Figure 2:
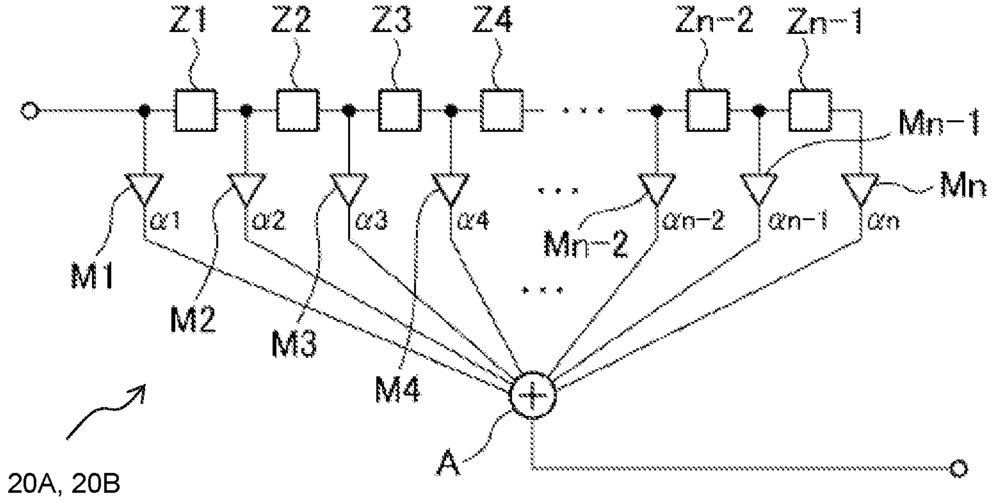
FIG. 2 is a diagram showing an example of a filter.

When analog audio signals are acquired, the input unit 16 converts the analog audio signals into digital audio signals. The input unit 16 inputs the digital audio signals into both a first SPU (Signal Processing Unit) 17A, which carries out the processing of a first filter (for example, 20A as shown in FIG. 2), and a second SPU 17B, which carries out the processing of a second filter (for example, 20B as shown in FIG. 2). The first filter adjusts the characteristics of the first audio signal(s) supplied to a first loudspeaker 19A, and the second filter adjusts the characteristics of the second audio signal(s) supplied to a second loudspeaker 19B. The processing of the first filter and the second filter can be performed by a single SPU. The use of both the first and second filters are not mandatory, so that only one of the two need be included in the setting device 10.

A filter is a circuit that processes and outputs input audio signals. The filter in this embodiment is a finite length FIR (Finite Impulse Response) filter. The frequency response is the filter characteristic on the time axis. The frequency response is used to set the filter coefficients. The first and second filter mechanisms are themselves similar. When no distinction is made between the first and second filters, they are referred to simply as the filter.

FIG. 2 is a diagram showing one example of the filter. The filter includes delay circuits Z1-Zn−1 and multipliers M1-Mn (where n is a natural number). n is the number of filter taps. The number of taps of the first filter and the number of taps of the second filter can be the same or different. Coefficients α1-αn are respectively set for each of the multipliers M1-Mn. A numerical sequence of impulse response values according to the frequency response is set as the coefficients α1-αn. The filter is an FIR filter that convolves an audio signal and the impulse responses (coefficients α1-αn). The number n of the coefficients α1-αn is determined in accordance with the available SPU resources for the filter. The number n corresponds to the upper limit of the length of the impulse response that can be set in the filter.

An audio signal input from the input unit 16 is input to multiplier M1 and delay circuit Z1. The audio signal input to delay circuit Z1 is delayed by a prescribed time and input to multiplier M2 and delay circuit Z2. In the same way, the audio signal is delayed by each of the delay circuits Z3-Zn−1. The delayed audio signal is input to each of the multipliers M3-Mn.

Each of the multipliers M1-Mn multiplies the audio signal input to it by the respective coefficients α1-αn. The products of the audio signal and the respective coefficients α1-αn of multipliers M1-Mn are input to an adder A. Adder A adds the audio signals output from each of the multipliers M1-Mn.

The first SPU 17A inputs the audio signal added by adder A of the first filter A to a first DAC (Digital Analog Converter) 18A. The second SPU 17B inputs the audio signal added by the adder A of the second filter to a second DAC 18B.

The first DAC 18A and the second DAC 18B are circuits that convert digital audio signals into analog audio signals. The first DAC 18A outputs the converted analog audio signals to the first loudspeaker 19A. The second DAC 18B outputs the converted analog audio signals to the second loudspeaker 19B.

Each of the first loudspeaker 19A and the second loudspeaker 19B output sounds corresponding to the analog audio signal that has been input. In this embodiment, the first loudspeaker 19A is a woofer that outputs low-frequency sound. The second loudspeaker 19B is a tweeter that outputs high-frequency sound.

The hardware configuration of the setting device 10 is not limited to the example described above. The setting device 10 can include a communication interface. The setting device 10 can include a reading device (e.g., an optical disc drive or a memory card slot) that reads one or more computer-readable storage media, or an input/output terminal (for example, a USB port) for inputting/outputting data. The program and data can be supplied via the communication interface, the reading device, or the input/output terminal.

2. Functional Block of the Setting Device

Figure 3:
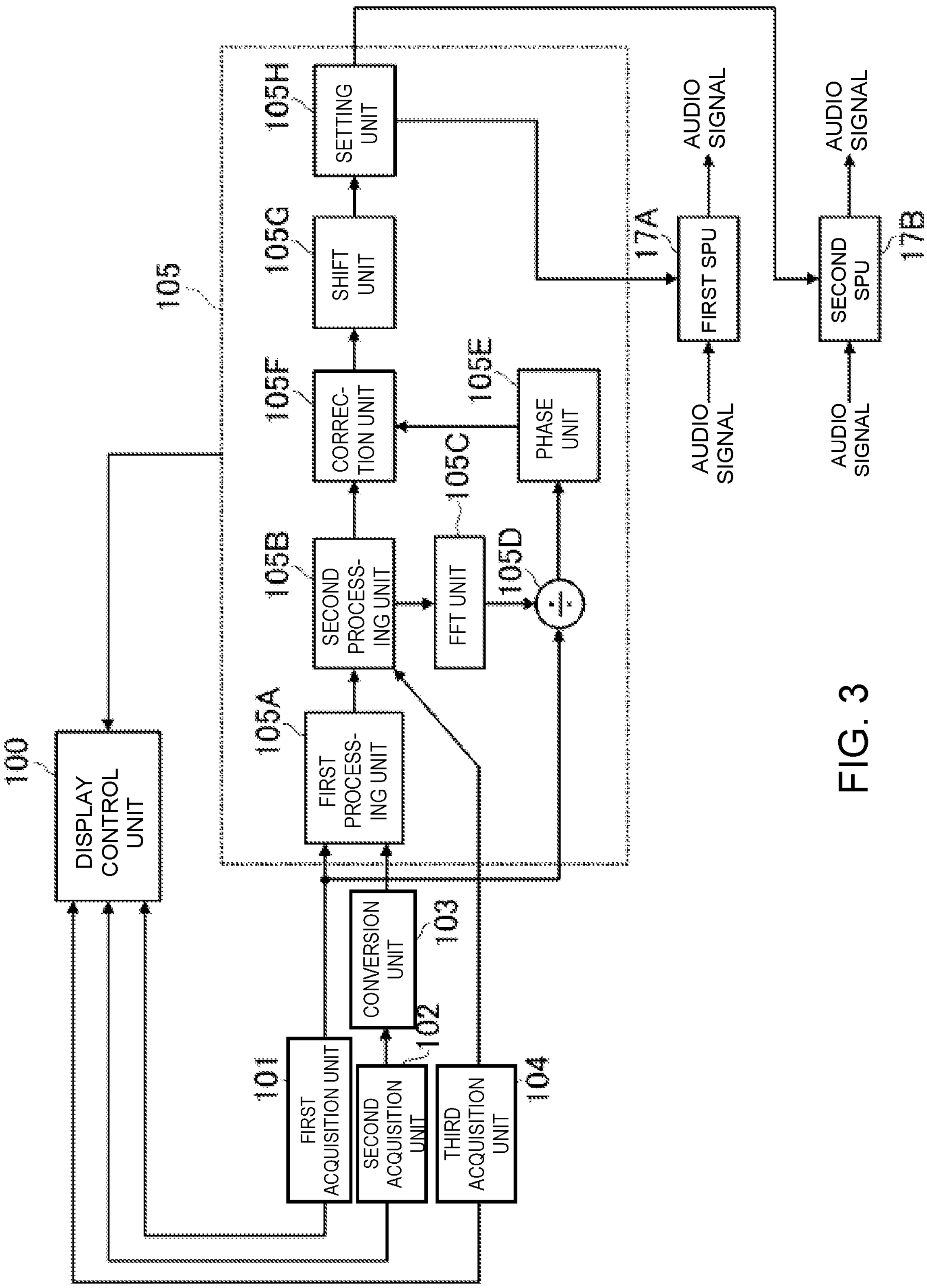
FIG. 3 is a diagram showing an example of the functional blocks of the setting device.

FIG. 3 is a diagram showing an example of the functional blocks of the setting device 10. The setting device 10 includes a display control unit 100, a first acquisition unit 101, a second acquisition unit 102, a conversion unit 103, a third acquisition unit 104, and a processing unit 105. These functions are realized primarily by the CPU 11.

2-1. Display Control Unit

Figure 4:
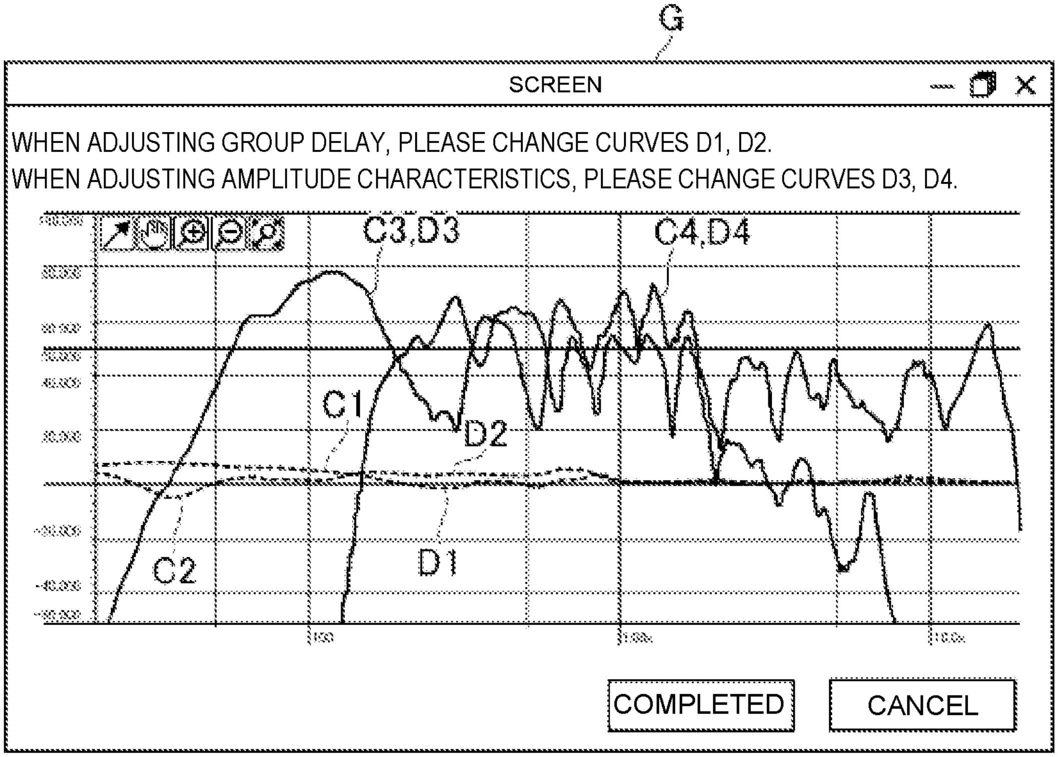
FIG. 4 is a diagram showing an example of the screen display.

The display control unit 100 causes the display unit 15 to display a screen G for accepting a first operation and second operation, described further below. FIG. 4 is a diagram showing an example of screen G. In FIG. 4, a logarithmic graph is used as an example. The horizontal axis of the graph is the frequency axis. The vertical axis of the graph is the group delay or amplitude axis. For example, the group delay is indicated in milliseconds. The amplitude is indicated in decibels. Curves C1-C4 are displayed on the graph.

Curve C1 is a first group delay curve that represents the sound delay for the frequency components of the first loudspeaker 19A. Curve C2 is a second group delay curve that represents the sound delay for the frequency components of the second loudspeaker 19B. The first group delay and the second group delay are acquired by the second acquisition unit 102, described further below. FIG. 4 shows curve C1 of the first group delay before adjustment and curve C2 of the second group delay before adjustment. On screen G, an operation to adjust the group delay of the first loudspeaker 19A and/or the group delay of the second loudspeaker 19B is accepted.

Also shown on screen G are curve D1, which estimates the group delay of the first loudspeaker 19A after adjustment, and curve D2, which estimates the group delay of the second loudspeaker 19B after adjustment. Prior to the setting of the filters, the first target group delay of the first filter and the second target group delay of the second filter are initialized to flat (a prescribed value indicating no delay adjustment over the entire frequency band, for example ±0 milliseconds). In this case, the shape of the group delay curve of each loudspeaker will be the same before and after adjustment, so that estimated curves D1 and D2 are respectively displayed on screen G coincident with curves C1, C2. On screen G, the target delay characteristics of the first and second filters are changed by a user operation to modify curves D1, D2.

Curve C3 is a curve of the first amplitude characteristic, which represents the sound pressure for the frequency components of the first loudspeaker 19A. Curve C4 is curve of the second amplitude characteristic, which represents the sound pressure for the frequency components of the second loudspeaker 19B. The first and second amplitude characteristics are acquired by the first acquisition unit 101, described further below. On screen G, an operation for adjusting the first audio signal amplitude characteristic and/or the second audio signal amplitude characteristic can be accepted.

Screen G also displays curve D3, which estimates the amplitude characteristic of the first loudspeaker 19A after adjustment, and curve D4, which estimates the amplitude characteristic of the second speaker 19B after adjustment. Prior to the setting of the filters, the target amplitude characteristics of the first and second filters are respectively initialized to flat (a prescribed value indicating no adjustment in amplitude over the entire frequency band, for example ±0 dB). In this case, the shape of the first amplitude characteristic and the second amplitude characteristic will be the same before and after adjustment, so that curves D3 and D4 are respectively displayed on screen G coincident with curves C3, C4. When the user performs an operation to modify the shapes of curves D3, D4 on screen G, the target amplitude characteristics of the first and second filters are respectively changed.

2-2. First Acquisition Unit

The first acquisition unit 101 acquires the first amplitude characteristic, which represents the frequency response of the sound pressure of the first loudspeaker 19A before adjustment. The first acquisition unit 101 acquires the second amplitude characteristic, which represents the frequency response of the sound pressure of the second loudspeaker 19B before adjustment. Curves C1, C2 on the screen G are displayed in accordance with the first and second amplitude characteristics acquired by the first acquisition unit 101.

If the user wishes to adjust only the group delay by the filters, the user can change only the curves D1, D2 without changing the curves D3, D4 on screen G. If the curves D3, D4 are not changed, the target amplitude characteristics of the first and second filters remain flat (initial state). If the user wishes to adjust both the amplitude characteristics and the group delay of the loudspeaker by the filters, the user can change the curves D1-D4 on screen G. The first acquisition unit 101 acquires the group delay characteristics and the target amplitude characteristics of the first and second filters that have been changed in accordance with the user's operation.

The target amplitude characteristic is the amplitude characteristic to be targeted. The target amplitude characteristic can be set automatically in accordance with sound measurement results rather than by user operation. If the estimated amplitude characteristic of either loudspeaker after adjustment (curves D3 or D4) is changed to a characteristic different from the amplitude characteristic of that loudspeaker (curve C3 or C4), the difference between the estimated amplitude characteristic and the amplitude characteristic of that loudspeaker is corrected by the filter.

2-3. Second Acquisition Unit

The second acquisition unit 102 acquires the first group delay, which is the delay for the frequency components of the sound of the first loudspeaker 19A. The first group delay is the group delay of the first loudspeaker 19A measured before adjustment. The second acquisition unit 102 uses a microphone to collect the sound output from the first loudspeaker 19A, to which a test signal (for example, an impulse signal) is applied, and calculates the delay for the frequency components from the collected sound using a known method.

Similarly, the second acquisition unit 102 acquires the second group delay, which indicates the delay for the frequency components of the sound of the second loudspeaker 19B. The second group delay is the group delay of the second loudspeaker 19B measured before adjustment.

The second acquisition unit 102 acquires the target group delay of the first loudspeaker 19A and the target group delay of the second loudspeaker 19B. The target group delay is the group delay to be targeted. The target group delay is the group delay after adjustment in accordance with the target band and the amount of adjustment specified on screen G. In this embodiment, the target band and the amount of adjustment are acquired as follows.

The second acquisition unit 102 acquires the target band, which is the band to be adjusted. The target band is part of the band from which the delay for the frequency components was acquired. In this embodiment, the user performs a first operation for specifying the target band. The second acquisition unit 102 acquires the target band in accordance with a first user operation. For example, the first operation corresponds to an operation in which the user changes the lower and upper limits of the target band displayed in the graph on screen G by a dragging operation. The first operation can also be any other operation. The second acquisition unit 102 acquires the band specified by the user as the target band.

Figure 5:
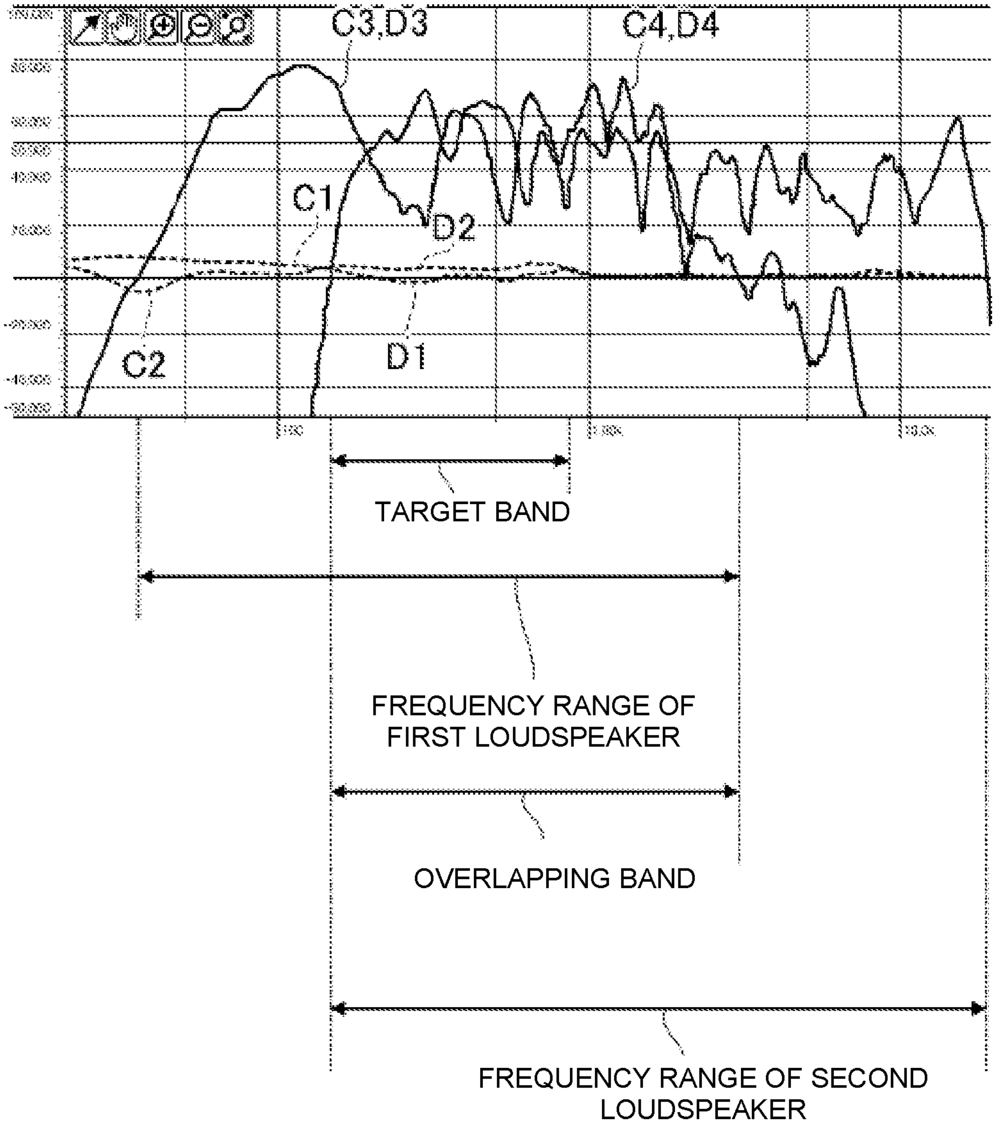
FIG. 5 is a diagram showing an example of the target band.

FIG. 5 is a diagram showing an example of the target band. The user sets the target band to at least part of an overlapping band in which the frequency range of the first loudspeaker 19A and the frequency range of the second loudspeaker 19B overlap. The frequency range of a loudspeaker is the band in which the sound pressure is greater than or equal to a threshold value. This threshold value can be any sound pressure value. The overlapping band is a portion where the frequency range of the first loudspeaker 19A and the frequency range of the second loudspeaker 19B overlap.

For example, if the above-described threshold value defining the frequency range is the sound pressure at the "0" position on the vertical axis of FIG. 5, the frequency range of the first loudspeaker 19A is the 35 Hz-4100 Hz band. The frequency range of the second loudspeaker 19B is the 150 Hz-15000 Hz band. The overlapping band is the 150 Hz-4100 Hz band.

In this embodiment, the target band is set to a band within the overlapping band where there is a difference between the first group delay and the second group delay. A band with a difference is a band in which the difference in the delay between the first group delay and the second group delay is greater than or equal to a threshold value. This threshold value can be any value from several hundreds of microseconds to a few milliseconds, for example. If this threshold value were to mark the boundaries where the aforementioned difference becomes visible in the graph of FIG. 5, the target band would extend from 150 Hz to 850 Hz The second acquisition unit 102 acquires an adjustment amount for adjusting the first audio signal supplied to the first loudspeaker 19A and/or the second audio signal supplied to the second loudspeaker 19B, so that the difference in the group delay between the first loudspeaker 19A and the second loudspeaker 19B in the target band is reduced. The second acquisition unit 102 acquires an adjustment amount for the frequency components in the target band. The adjustment amount is specifically the target group delay of the target band. The target group delay outside of the target band is flat, and thus need not have a value. The adjustment amount (target group delay) for adjusting the first audio signal is used to calculate the frequency response of the first filter. The adjustment amount (target group delay) for adjusting the second group delay is used to calculate the frequency response of the second filter.

The second acquisition unit 102 acquires the adjustment amount corresponding to the difference in delay between the first group delay (curve C1) and the second group delay (curve C2) in the target band. Since the difference in delay is different at each frequency, the second acquisition unit 102 acquires the adjustment amount for each frequency. The greater the difference in delay at a certain frequency, the greater the adjustment amount that is set for this frequency.

In the target band of FIG. 5, since the difference in delay is maximum around 300 Hz, the adjustment amount set in the vicinity of 300 Hz is greater than the adjustment amount set for the other bands. The adjustment amount for each frequency need not be a value that completely reduces the difference in delay at that frequency to zero. The adjustment amount can be a value such that a certain degree of delay difference remains.

Figure 6:
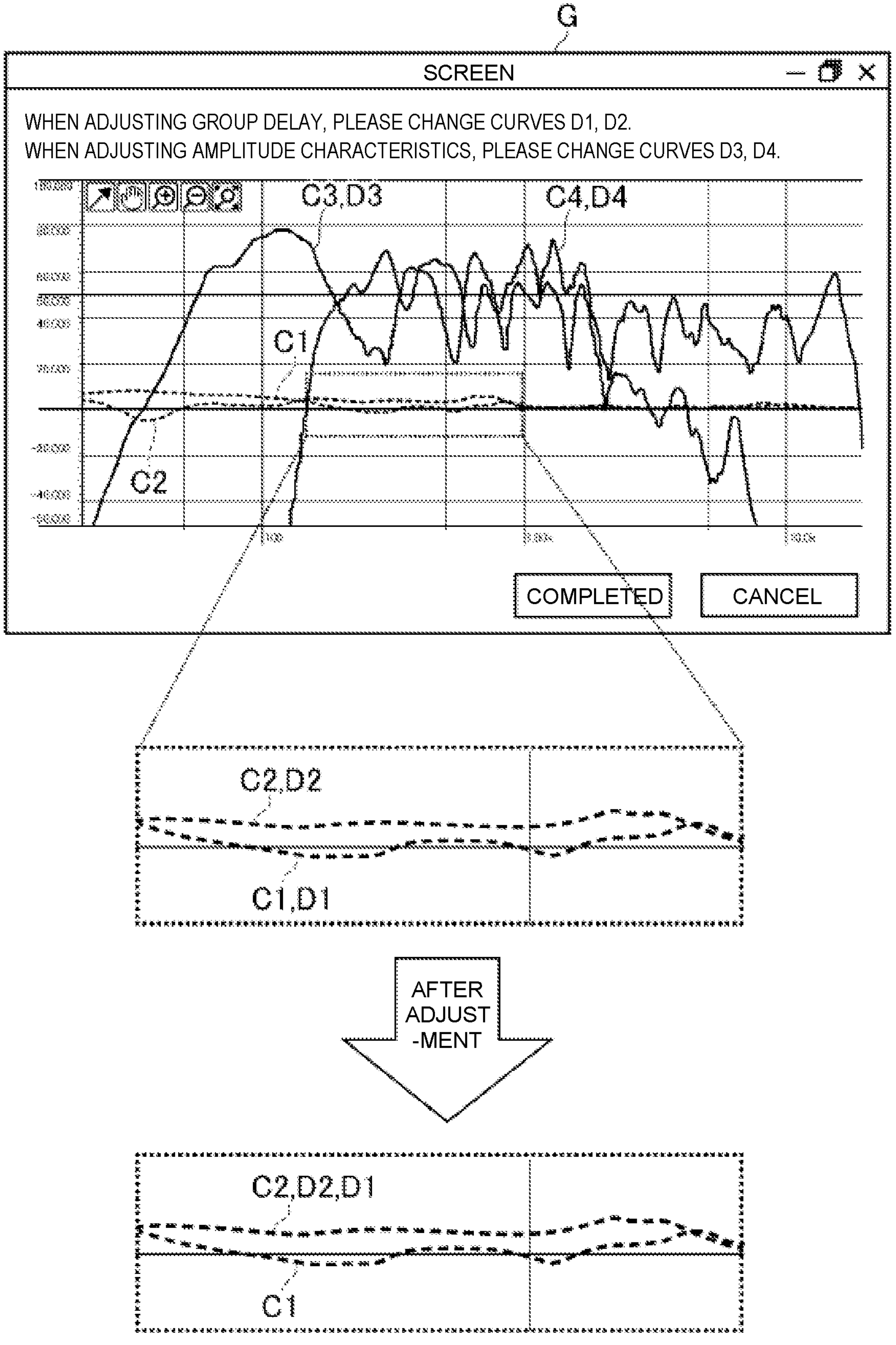
FIG. 6 is a diagram showing an example of the screen display being updated.

The second acquisition unit 102 acquires an adjustment amount corresponding to the difference in delay between the first group delay and the second group delay in response to a second user operation. The second operation is, for example, an operation in which the user drags curve D1 or curve D2 on screen G vertically. For example, if the user drags and drops curve D1, which overlaps curve C1, upward on screen G of FIG. 6, the product of the delay difference for each frequency in the target band multiplied by the coefficient corresponding to the dropped location is calculated as the adjustment value, and that adjustment value is combined with a prescribed value indicating no adjustment outside of the target band to generate the target group delay of the first filter. This coefficient can take on any value within the range of 0 to 1. The second operation can be any other operation. The amount of change in the adjustment amount per step of the second operation can be set in accordance with the difference between the first group delay and the second group delay.

If, of curves D1 and D2, only the one with the smaller delay in the target band is changed to approach the other curve, the second acquisition unit 102 acquires an adjustment amount for matching the group delay of the loudspeaker with the smaller of the first group delay and the second group delay to the group delay of the loudspeaker with the larger delay, in accordance with the aforementioned change. This adjustment amount is the adjustment amount for delaying the sound of whichever of the first loudspeaker 19A and the second loudspeaker 19B has the relatively smaller group delay; in this case, the latency of the filter (as well as the latency as a loudspeaker system) can be minimized. In the target band shown in FIG. 5, since the first group delay (curve C1) is smaller than the second group delay (curve C2), the user performs an operation to change curve D1, and the second acquisition unit 102 acquires an adjustment amount (target group delay of the first filter) for delaying the sound of the first loudspeaker 19A.

If, under the constraint of minimizing the latency of the filters, there is a band within the target band in which the first group delay is smaller than the second group delay and a band in which the second group delay is smaller than the first group delay, the second acquisition unit 102 need only acquire the adjustment amount to match the smaller of the first group delay and the second group delay to the larger one for each of these individual bands.

If the filter is allowed to have a certain degree of latency, the second acquisition unit 102 can acquire an adjustment amount to match the group delay of the loudspeaker with the larger of the first and second group delays to the group delay of the loudspeaker with the smaller delay, within a range corresponding to the aforementioned latency. Latency is the delay of the audio signal through the filter, and the latency value(s) is(are) a parameter(s) for controlling latency. The frequency response is adjusted in accordance with the latency value. For example, the latency value is specified by a user operation on screen G.

2-4. Conversion Unit

The conversion unit 103 converts each of the first target group delay of the first filter and the second target group delay of the second filter into a target phase characteristic for each frequency. As described above, the target group delay includes a correction amount as a component of its target band.

2-5. Third Acquisition Unit

The third acquisition unit 104 acquires the aforementioned latency value in accordance with a user operation. The latency value can instead be a prescribed fixed value that is not specified by the user.

2-6. Processing Unit

The processing unit 105 generates the frequency response of the first filter for controlling the characteristics of the first audio signal supplied to the first loudspeaker 19A and/or the frequency response of the second filter for controlling the characteristics of the second audio signal supplied to the second loudspeaker 19B in accordance with the adjustment amount. The processing unit 105 generates the frequency response of the first filter and/or the frequency response of the second filter in accordance with the first and second target amplitude characteristics and the first and second target group delays (correction amounts), and assigns same to the corresponding filter.

If the first target amplitude characteristic and the first target group delay retain their initial values (flat), then processing of the first filter is not required and is replaced with a delay process for delaying the first audio signal in accordance with the latency value. If the second target amplitude characteristic and the second target group delay retain their initial values (flat), then the processing of the second filter is not required and is replaced with a delay process for delaying the second audio signal in accordance with the latency value.

The processing unit 105 adjusts either the first audio signal or the second audio signal, whichever corresponds to the smaller of the first group delay or the second group delay in the target band, by the corresponding filter, i.e., either the first filter or the second filter, in accordance with the adjustment amount, to reduce the difference of the delay relative to the other audio signal in the target band. The processing unit 105 calculates the frequency response of the first filter in accordance with the first target group delay (adjustment amount of the first group delay) and sets this frequency response to the first filter. The processing unit 105 calculates the frequency response of the second filter, in accordance with the second target group delay (adjustment amount of the second group delay) and sets this frequency response to the second filter.

The processing unit 105 of the present embodiment includes a first processing unit 105A, second processing unit 105B, FFT unit 105C, divider 105D, phase unit 105E, correction unit 105F, shift unit 105G, and setting unit 105H. The filter setting process described below is the same for both the first and second filters, and can generate both the frequency response of the first filter and the frequency response of the second filter. Therefore, in the following, no distinction is made between the first and second filters, and simple descriptions will be used, such as target group delay, target amplitude characteristic, frequency response of the filter, and the like.

The first processing unit 105A receives the set of target amplitude characteristic and target phase characteristic converted from the target group delay (adjustment value) by the conversion unit 103 as a first frequency response. The first processing unit 105A transforms the first frequency response from the frequency domain to the time domain by an inverse Fourier Transform (iFFT (inverse fast Fourier transform)), thereby obtaining a first impulse response. The frequency response in the frequency domain is equivalent to the impulse response in the time domain. The impulse response is a time series of filter coefficients.

The second processing unit 105B trims (deletes) the front portion of the first impulse response such that the latency of the filter which, as a coefficient, sets the first impulse response is equal to the latency indicated by the latency value acquired by the third acquisition unit 104, to obtain a second impulse response. The second impulse response is a frequency response that has a prescribed latency and is close to the first frequency response. The process of the second processing unit 105B generates at least one frequency response in accordance with the adjustment amount, under the constraint of the latency value that defines the sound delay of the filter.

The FFT unit 105C takes the Fourier Transform (FFT (fast Fourier transform)) of the second impulse response to obtain a second frequency response. Due to the trimming by the second processing unit 105B, an amplitude error occurs between the target amplitude characteristic and the amplitude characteristic of the second frequency response.

The divider 105D calculates the difference between the target amplitude characteristic and the amplitude characteristic of the second frequency response as the amplitude error. This difference is calculated by subtraction of the decibel values in the frequency domain. The subtraction of decibel values corresponds to the division of linear values and thus is indicated by the division symbol in FIG. 3.

The phase unit 105E obtains the frequency response for correction in accordance with the amplitude error calculated by the divider 105D. The phase characteristic of the frequency response for correction is calculated from the amplitude error using the minimum phase.

The correction unit 105F corrects the second impulse response in accordance with the frequency response for correction to obtain a third impulse response. The amplitude characteristic of the frequency response of the third impulse response is closer to the target amplitude characteristic than the second impulse response.

The shift unit 105G time-shifts the zero time point in the third impulse response to a point corresponding to the latency value. This shifts the beginning of the third impulse response (minus point for the latency value) to the zero time point (t=0). The setting unit 105H sets the values of points (t=0, 1, −n) in the third impulse response after the shift in the filter as the coefficients α1-αn for each tap.

The group delay of the loudspeaker in the subsequent stage to which the filtered audio signal is supplied is adjusted by the coefficients α1-αn that have been set. The display control unit 100 can acquire the adjusted group delay of the loudspeaker and update the display of screen G.

3. Process Executed by the Setting Device

Figure 7:
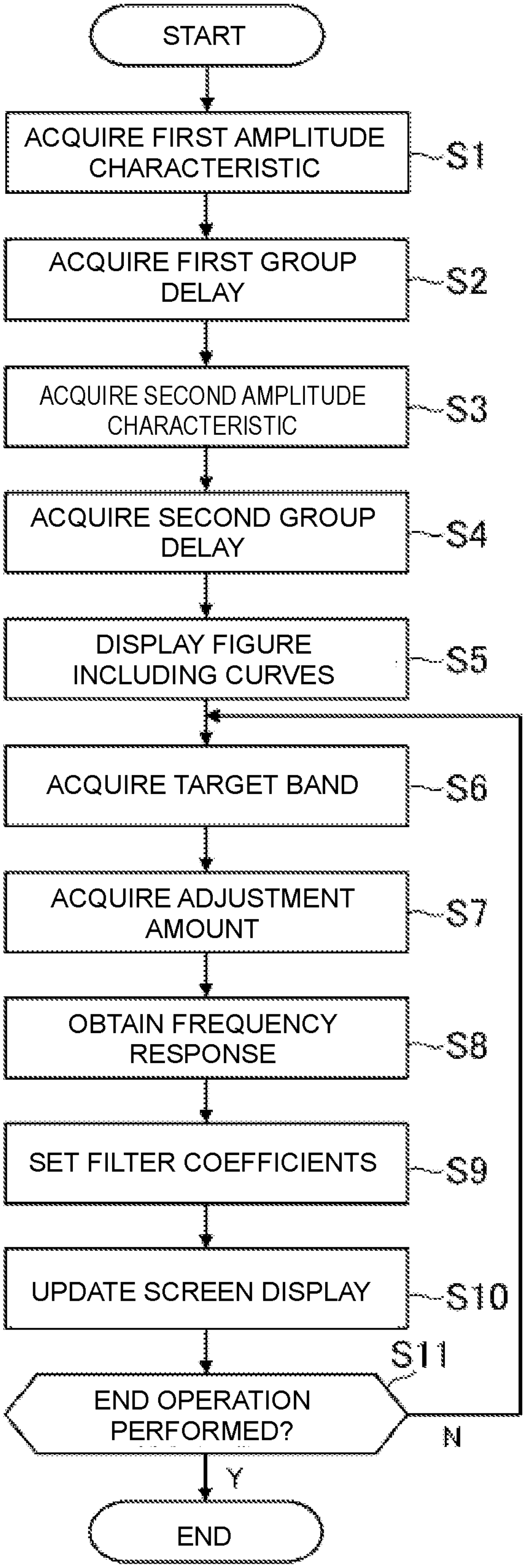
FIG. 7 is a flowchart showing an example of the process executed by the setting device.

FIG. 7 is a flowchart showing an example of a loudspeaker group delay control process executed by the setting device 10. The process shown in FIG. 7 is executed by CPU 11 in accordance with a program stored in non-volatile memory 12. This process realizes the functions of each of the blocks 100-105 of FIG. 3.

As shown in FIG. 7, CPU 11 acquires the first amplitude characteristic of the first loudspeaker 19A before adjustment (S1). CPU 11 acquires the first group delay of the first loudspeaker 19A before adjustment (S2).

CPU 11 acquires the second amplitude characteristic of the second loudspeaker 19B before adjustment (S3). CPU 11 acquires the second group delay of the second loudspeaker 19B before adjustment (S4).

CPU 11 causes the display unit 15 to display screen G including curves C1-C4 and curves D1-D4, in accordance with the information acquires in each of steps S1 to S4 (S5). CPU 11 acquires the target band in response to the first operation performed by the user on the operation unit 14 to specify the lower limit and the upper limit (S6). CPU 11 acquires the adjustment amount for the frequency components in the target band in response to the second operation performed by the user on the operation unit 14 to change curves D1, D2 (S7).

CPU 11 obtains the frequency response of the first filter and the frequency response of the second filter in accordance with the target band acquired in S6 and the adjustment amount for the frequency components acquired in S7 (S8).

CPU 11 sets the coefficients α1-αn for the first and second filters in accordance with the frequency response of the first and second filters obtained in S8 (S9). CPU 11 updates the display of screen G (S10).

CPU 11 determines whether a prescribed end operation has been performed by the user (S11). If it is not determined that an end operation has been carried out (S11; N), the process returns to S6. In this case, the user again specifies the target band and the adjustment amount. If it is determined that an end operation has been carried out (S11; Y), the process is terminated.

In the present embodiment, by setting the frequency response for each of the first and second filters with the setting device 10, the difference in the group delay of the sound between the first loudspeaker 19A and the second loudspeaker 19B in the target band is reduced. Therefore, in the overlapping band, the group delay of the sound of the first loudspeaker 19A and the group delay of the sound of the second loudspeaker 19B are matched, so that the sound is smoothly connected from the frequency range of the first loudspeaker 19A to the frequency range of the second loudspeaker 19B. By specifying the target band and limiting the band for which an adjustment amount is acquired, a filter of limited length (that is, with an impulse response of limited length) can be used to adjust the group delay of loudspeakers with higher quality.

The setting device 10 acquires the target band and the adjustment amount in accordance with the first and second user operations. As a result, the target band and the adjustment amount can be specified as desired by the user.

When only the audio signal supplied to a loudspeaker corresponding to the one with the smaller of the first group delay and the second group delay in the target band is adjusted (in the case of only an adjustment to slow down the output sound), the latency of the filter that adjusts the audio signal can be minimized.

The setting device 10 generates a frequency response in accordance with the adjustment amount under the constraint corresponding to its latency value. The user can control the latency of the filter used in the adjustment of the group delay.

Under the constraint corresponding to the latency value, the setting device 10 adjusts only whichever of the first and second audio signals corresponds to the larger of the first and second group delay in the target band, such that the difference in delay with the other audio signal in the target band is reduced (speeds up the output sound) by the corresponding filter, of the first and second filters, in accordance with the adjustment amount. If the latency is controlled in accordance with the latency value, the group delay of the loudspeaker with the larger delay in the target band can be adjusted (in addition to adjusting the group delay of the loudspeaker with the smaller delay in the target band).

The target band in the setting device 10 belongs to an overlapping band where the frequency range of the first loudspeaker 19A and the frequency range of the second loudspeaker 19B overlap. For this reason, the target band is a narrow band that is part of the overall frequency band, so that a higher quality group delay adjustment can be performed with an impulse response of limited length.

The target band in the setting device 10 belongs to a band in the overlapping band in which the first group delay and the second group delay differ from each other. Therefore, the target band can be further narrowed, and a group delay control of even higher quality can be performed

4. Modified Example

This disclosure is not limited to the embodiments. This disclosure can be modified to the extent that it does not depart from the essence of the invention.

The setting device 10 can automatically determine the target band and/or the adjustment amount in accordance with the first group delay and the second group delay. For example, the setting device 10 can detect a band within the overlapping band in which there is a difference between the first group delay and the second group delay and automatically set said band as the target band. For example, the setting device 10 calculates the difference in delay for the frequency components. The setting device 10 obtains an adjustment amount for reducing this difference. Because the target band and/or the adjustment amount are automatically determined in accordance with the first group delay and the second group delay, the operating burden on the user can be reduced. Since the setting device 10 obtains a frequency response corresponding to the automatically obtained target band and adjustment amount, the operating burden on the user can be reduced.

The target band and the adjustment amount can be specified directly from the operation unit 14 without displaying the screen G. The first and second loudspeakers 19A and 19B can be loudspeakers that are positioned in different locations from each other and output sound in the same band. The system for setting the frequency response of the filter is not limited to aa single setting device 10. The system can include a plurality of devices connected by a network or serial bus.

Effects

By this disclosure, the group delay of the sound of the first loudspeaker can match the group delay of the sound of the second loudspeaker.

What is claimed is:

1. A method for controlling loudspeaker group delay, the method comprising:

acquiring a latency value that defines delay of sound through a filter;

acquiring a first group delay indicating delay for each frequency of sound of a first loudspeaker;

acquiring a second group delay indicating delay for each frequency of sound of a second loudspeaker;

calculating an adjustment amount for adjusting at least one of a first audio signal supplied to the first loudspeaker, or a second audio signal supplied to the second loudspeaker, or both, such that a difference in the sound of the first loudspeaker and the sound of the second loudspeaker in a target band, which is a band to be adjusted, is reduced; and generating at least one of a frequency response of a first filter that controls characteristics of the first audio signal supplied to the first loudspeaker, or a frequency response of a second filter that controls characteristics of the second audio signal supplied to the second loudspeaker, or both, the generating being performed in accordance with the adjustment amount and performed such that a latency of at least one of the first filter or the second filter of which the frequency response is generated, or both falls within a time length according to the latency value.

2. The method according to claim 1, wherein the generating includes correcting an amplitude error caused by controlling the latency to fall within the time length according to the latency value, and the at least one or both frequency responses of the at least one of the first filter or the second filter, or both are obtained by the correcting of the amplitude error.

3. The method according to claim 1, wherein each of the latency of the first filter and the latency of the second filter is controlled to correspond to the time length according to the latency value, to fall within the time length according to the latency value.

4. The method according to claim 1, wherein the latency value is a value that is specified by a user operation.

5. The method according to claim 1, wherein the adjustment amount includes a first target group delay of the first filter and a second target group delay of the second filter, and in the generating, such that the latency falls within the time length according to the latency value, the frequency response of the first filter is generated in accordance with the first target group delay, and the frequency response of the second filter is generated in accordance with the second target group delay.

6. The method according to claim 1, further comprising acquiring a first target amplitude characteristic indicating a difference between an estimated amplitude characteristic after adjustment of the first loudspeaker and an amplitude characteristic before adjustment of the first loudspeaker, and acquiring a second target amplitude characteristic indicating a difference between an estimated amplitude characteristic after adjustment of the second loudspeaker and an amplitude characteristic before adjustment of the second loudspeaker, wherein the adjustment amount includes a first target group delay of the first filter and a second target group delay of the second filter, and in the generating, such that the latency falls within the time length according to the latency value, the frequency response of the first filter is generated in accordance with the first target amplitude characteristic and the first target group delay, and the frequency response of the second filter is generated in accordance with the second target amplitude characteristic and the second target group delay.

7. The method according to claim 6, wherein the generating includes correcting, such that the latency falls within the time length according to the latency value, each of an amplitude error in an impulse response in accordance with the first target amplitude characteristic and the first target group delay, and an amplitude error in an impulse response in accordance with the second target amplitude characteristic and the second target group delay, and each of the frequency response of the first filter and the frequency response of the second filter is the frequency response obtained by the correcting of each amplitude error.

8. The method according to claim 6, wherein the generating is performed by generating the frequency response of the first filter and the frequency response of the second filter from first and second target frequency responses, the first target frequency response is a set of the first target amplitude characteristic and a first target phase characteristic converted from the first target group delay, the second target frequency response is a set of the second target amplitude characteristic and a second target phase characteristic converted from the second target group delay, the generating includes, for each of the first and second target frequency responses, obtaining an impulse response by inversing Fourier transforming a target frequency response as each of the first target frequency response and the second target frequency response, and trimming a front portion of the impulse response such that a filter which is each of the first filter and the second filter and on which the impulse response is set has the latency of the latency value, calculating, as an amplitude error, a difference between an amplitude characteristic of the target frequency response and an amplitude characteristic of the impulse response to which the trimming has been performed, correcting the impulse response to which the trimming has been performed, in accordance with a frequency response in according with the amplitude error, and time-shifting, in accordance with the latency value, the impulse response that has been corrected, and the impulse response that has been time-shifted is set as the frequency response for each of the first filter and second filter.

9. The method according to claim 1, further comprising acquiring the target band in accordance with a first user operation, and acquiring the adjustment amount in accordance with a second user operation, wherein the calculation of the adjustment amount is performed using the adjustment amount that has been acquired.

10. The method according to claim 1, further comprising automatically determining at least one the target band or the adjustment amount, or both, in accordance with the first group delay and the second group delay.

11. The method according to claim 1, wherein only one of the first audio signal and the second audio signal, which corresponds to a smaller delay of the delays in the target band indicated by the first group delay and the second group delay, is adjusted, by a corresponding filter that is the first filter or the second filter, in accordance with the adjustment amount, to reduce a delay difference relative to the other of the first audio signal and the second audio signal in the target band.

12. The method according to claim 1, wherein the target band belongs to an overlapping band in which a frequency range of the first loudspeaker and a frequency range of the second loudspeaker overlap.

13. The method according to claim 12, wherein the target band belongs to a band in the overlapping band in which the first group delay and the second group delay differ from each other.

14. A system for controlling loudspeaker group delay, the system comprising:
one or more processors; and
one or more memory units,
the one or more processors being configured to execute a program stored in the one or more memory units, thereby
acquiring a latency value that defines delay of sound through a filter,
acquiring a first group delay representing delay for each frequency of sound of a first loudspeaker,
acquiring a second group delay representing delay for each frequency of sound of a second loudspeaker,
calculating an adjustment amount for adjusting at least one of a first audio signal supplied to the first loudspeaker, or a second audio signal supplied to the second loudspeaker, or both, such that a difference between the sound of the first loudspeaker and the sound of the second loudspeaker in a target band, which is the band to be adjusted, is reduced, and generating at least one of a frequency response of a first filter that controls characteristics of the first audio signal supplied to the first loudspeaker, or a frequency response of a second filter that controls characteristics of the second audio signal supplied to the second loudspeaker, or both, the generating being performed in accordance with the adjustment amount and performed such that a latency of at least one of the first filter or the second filter of which the frequency response is generated, or both falls within a time length according to the latency value.

15. One or more non-transitory storage media for a storage of a computer-readable program for causing one or more processors to perform a process comprising:

acquiring a latency value that defines delay of sound through a filter;

acquiring a first group delay representing delay for each frequency of sound of a first loudspeaker;

acquiring a second group delay representing delay for each frequency of sound of a second loudspeaker;

calculating an adjustment amount for adjusting at least one of a first audio signal supplied to the first loudspeaker, or a second audio signal supplied to the second loudspeaker, or both, such that a difference between the sound of the first loudspeaker and the sound of the second loudspeaker in a target band, which is a band to be adjusted, is reduced; and generating at least one of a frequency response of a first filter that controls characteristics of the first audio signal supplied to the first loudspeaker, or a frequency response of a second filter that controls characteristics of the second audio signal supplied to the second loudspeaker, or both, the generating being performed in accordance with the adjustment amount and performed such that a latency of at least one of the first filter or the second filter of which the frequency response is generated, or both falls within a time length according to the latency value.

* * * * *